Feb. 5, 1946.  G. B. WARREN  2,394,032
ANIMAL TRAP
Filed June 29, 1944   2 Sheets-Sheet 1
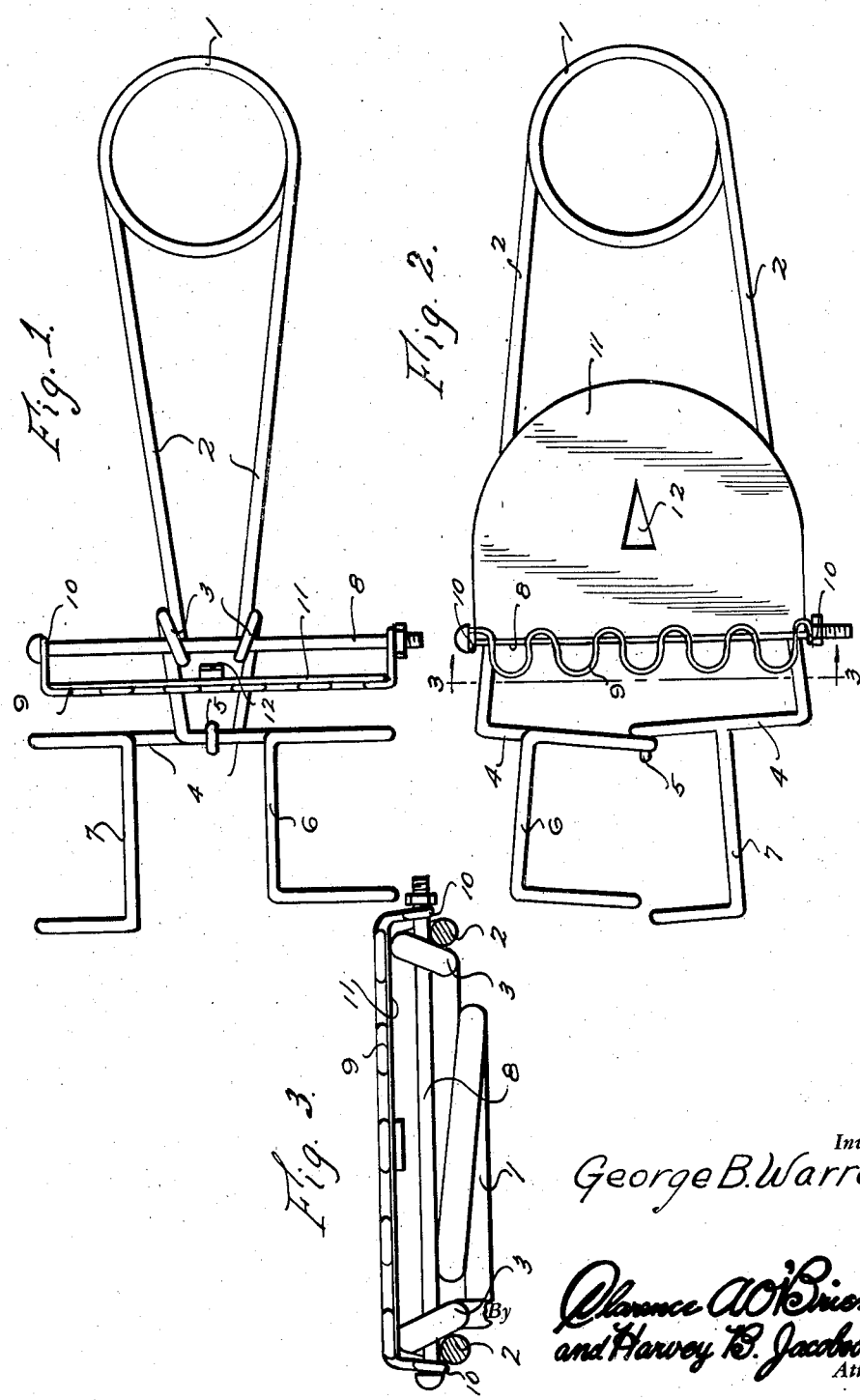
Inventor
George B. Warren Feb. 5, 1946.   G. B. WARREN   2,394,032
ANIMAL TRAP
Filed June 29, 1944   2 Sheets-Sheet 2
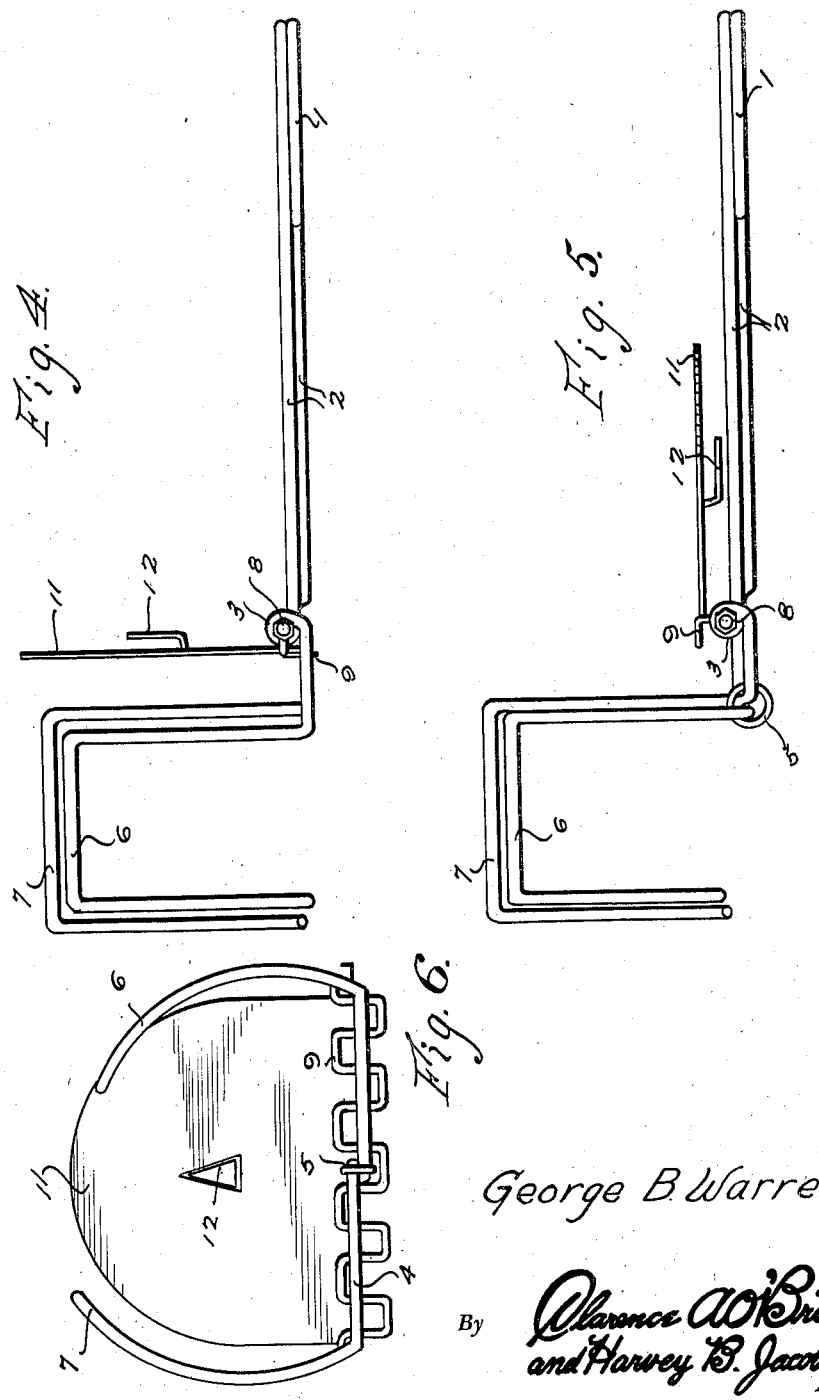
Inventor
George B. Warren Patented Feb. 5, 1946

2,394,032

UNITED STATES PATENT OFFICE 2,394,032

ANIMAL TRAP

George B. Warren, Los Angeles, Calif.

Application June 29, 1944, Serial No. 542,673

2 Claims. (Cl. 43—88)

The present invention relates to new and useful improvements in traps, particularly for gophers, although it will be understood, of course, that the device may be used for catching any other animals for which it may be found adapted.

An important object of the invention is to provide, in a trap of the character described comprising a pair of opposed, coacting, spring-actuated jaws, trigger means of unique construction for adjusting the distance between said jaws as desired when the trap is set for use in different sizes of gopher holes or runs.

Another very important object of the invention is to provide a trap of the aforementioned character comprising a trigger means which may be mounted for operation by either a pushing or pulling force exerted thereon for releasing or springing the trap.

Still another important object of the invention is to provide a trap of the character set forth embodying a construction and arrangement whereby the fur of an animal caught therein will be damaged in no way.

Other objects of the invention are to provide an animal trap which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings, wherein like characters of reference designate corresponding parts throughout the several views, and wherein:

Figure 1 is a top plan view of a trap constructed in accordance with the present invention, showing said trap set.

Figure 2 is a top plan view, showing the trap sprung or closed.

Figure 3 is a view in transverse section, taken substantially on the line 3—3 of Figure 2.

Figure 4 is a side elevational view, showing the trap set.

Figure 5 is a side elevational view, showing the trap sprung.

Figure 6 is a view in front elevation of the trap, showing said trap set.

Referring now to the drawings in detail, it will be seen that the embodiment of the invention which has been illustrated comprises a coil spring 1. Formed integrally with the ends of the spring 1 is a pair of normally diverging arms 2. The forward portions of the arms 2 are formed to provide upstanding, transversely aligned loops 3. Forwardly of the loops 3, the arms 2 terminate in inturned free end portions 4 which are slidably connected by a ring 5 loosely mounted thereon. Formed integrally with the end portions 4 of the arms 2 are upstanding, oppositely curved jaws 6 and 7 of substantially inverted U shape. The jaw 6 is smaller than the jaw 7 to pass therethrough when the trap is closed.

Removably mounted in the loops 3 is a transverse shaft 8 on which said loops are slidable to permit opening and closing of the arms 2. Removably mounted on the shaft 8 is a substantially zig-zag rod 9. The rod 9 is provided on its ends with eyes 10 which are journaled on the end portions of the shaft 8. Fixed on the rod 9 is a substantially segmental trigger plate 11. A prong or tooth 12 is struck from the trigger plate 11 for mounting bait thereon when desired.

In the arrangement of the trigger plate, etc., which has been shown, the trap is adapted to be sprung by a pushing force exerted on said plate from the direction of the jaws 6 and 7. In use, with the members 9 and 11 in a substantially horizontal position, as seen in Figures 2 and 5 of the drawings, the arms 2 are closed against the tension of the spring 1, the loops 3 sliding inwardly on the shaft 8. Thus, the jaws 6 and 7 are opened to substantially the position shown in Figures 1 and 6 of the drawings. The trigger plate 11 is then swung upwardly for swinging the rod 9 downwardly into engagement with the arms 2 at a point adjacent the loops 3. A pair of the recesses or pockets in the substantially zig-zag rod 9 receive the arms 2 for securing said arms in closed position against the tension of the spring 1 and in this manner the trap is set. The trap is then placed in a gopher run, for example, with the open jaws 6 and 7 in the sides thereof to receive the animal therebetween. When the gopher, pushing the dirt before it, enters between the jaws 6 and 7 and pushes on the plate 11, said plate is swung downwardly. Thus, the rod 9 is disengaged from the arms 2 and the trap is sprung, the animal being caught between the jaws 6 and 7. By engaging the arms 2 in different recesses or pockets in the substantially zig-zag rod 9, the jaws 6 and 7 may be spaced as desired when the trap is set. It will accordingly be seen that the trap, when set, may be adjusted to the size of the hole. When the trap is to be used for catching animals which are attracted by bait, the members 11 and 9 are reversed to position the prong 12 adjacent the jaws 6 and 7. This may be readily accomplished by simply removing and replacing the shaft 8. The rod 9 will now engage the arms 2 on the opposite sides of the loops 3 from the jaws 6 and 7. Suitable bait is then impaled on the prong 12. The animal enters between the jaws 6 and 7 and attempts to get the bait. In so doing the animal pulls the plate 11 toward the jaws 6 and 7 and the rod 9 is disengaged from the arms 2 thereby springing the trap.

It is believed that the many advantages of a trap constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A trap comprising a pair of arms, a spring operatively connected to the arms for swinging said arms away from each other, a pair of coacting jaws on the arms, a substantially zig-zag rod mounted for swinging movement on the arms and engageable therewith for releasably securing the jaws in set position, and a member operable by an animal mounted on the rod for disengaging said rod from the arms.

2. A trap comprising a coil spring, a pair of normally diverging arms integral with the ends of said spring, loops on the arms, a shaft slidably engaged in the loops, a pair of coacting jaws on the arms, a substantially zig-zag rod mounted for swinging movement on said shaft and adjustably engageable with the arms for securing the jaws in set position, and a plate fixed on the rod and operable by an animal for disengaging said rod from the arms for springing the trap.

GEORGE B. WARREN.